United States Patent
Dinter et al.

(10) Patent No.: US 7,325,215 B2
(45) Date of Patent: Jan. 29, 2008

(54) TIMING VIOLATION DEBUGGING INSIDE PLACE AND ROUTE TOOL

(75) Inventors: Matthias Dinter, Holzkirchen (DE); Juergen Dirks, Holzkirchen (DE); Herbert Johannes Preuthen, Dorfen (DE)

(73) Assignee: LSI Logic Corporation, Milpitas, CA (US)

( * ) Notice: Subject to any disclaimer, the term of this patent is extended or adjusted under 35 U.S.C. 154(b) by 217 days.

(21) Appl. No.: 11/216,918

(22) Filed: Aug. 31, 2005

(65) Prior Publication Data

US 2007/0050745 A1 Mar. 1, 2007

(51) Int. Cl.
G06F 17/50 (2006.01)

(52) U.S. Cl. ............................................. 716/11; 716/6

(58) Field of Classification Search .............. 716/8–12, 716/6
See application file for complete search history.

(56) References Cited

U.S. PATENT DOCUMENTS 5,793,643 A * 8/1998 Cai .............................. 716/12
6,230,304 B1 * 5/2001 Groeneveld et al. ............ 716/7
7,069,528 B2 * 6/2006 Kovacs et al. ................. 716/6
2003/0005398 A1 * 1/2003 Cho et al. ....................... 716/8
2006/0271899 A1 * 11/2006 Tan et al. ....................... 716/13

* cited by examiner

Primary Examiner—Jack Chiang
Assistant Examiner—Binh Tat
(74) Attorney, Agent, or Firm—Christopher P. Maiora, PC

(57) ABSTRACT

A method for developing a circuit design is disclosed. The method generally include the steps of (A) generating a violation display based on violation information provided from a place-and-route tool and (B) generating a layout display based on layout information provided from the place-and-route tool. The violation display may include (i) a plurality of performance violations for the circuit design and (ii) a plurality of user inputs each associated with one of the performance violations. The layout display may include a layout view of the circuit design. The layout view may highlight at least one of (i) a plurality of cells and (ii) a plurality of networks each along a path related to a particular one of the performance violations identified by a user through the user inputs.

19 Claims, 9 Drawing Sheets

220

| VIOLATION DISPLAY ||||||| 
| SETUP | VIOLATION/ps | HOLD | VIOLATION/ps | RAMPTIME | VIOLATION/ns | CROSSTALK |
|---|---|---|---|---|---|---|
| CELLA/PINA | 25 | CELLC/PINA | 120 | CELLG/PINA | 0.12 | NETA |
| CELLB/PINA | 11 | CELLD/PINA | 77 | | | |
| | | CELLE/PINA | 33 | | | |
| | | CELLF/PINA | 12 | | | |

230

TIMING DISPLAY

| PATH | NETNAME | DELAY/ns | RAMPTIME/ns AT THE RECEIVING PIN |
|---|---|---|---|
| CELL1/PINA - CELL1/PINZ | | 0.050 | |
| CELL1/PINZ - CELL2/PINA | NET1 | 0.100 | 0.02 |
| CELL2/PINA - CELL2/PINZ | | 0.150 | |
| CELL2/PINZ - CELLA/PINA | NET2 | 0.400 | 0.1 |
| | TOTAL DELAY | 0.800 | |
| | REQUIRED DELAY | 0.775 | |
| | VIOLATION | 0.025 | |

REPLACEMENT DISPLAY

| CELL NAME | DELAY/ns | SETUP/ns | HOLD/ns | RAMP/ns |
|---|---|---|---|---|
| CELL2A | 0.047 | 0.030 | | |
| CELL2B | 0.055 | 0.030 | | |
| CELL2C | 0.68 | 0.030 | | |
| CELL2F | 0.73 | | 0.027 | |
| CELL2K | 0.110 | | 0.029 | |

| NETWORK DISPLAY | |
|---|---|
| NETLENGTH | 3.2 mm |
| TOTAL RESISTANCE | 522 mOhm |
| HIGHEST RESISTANCE | 122 mOhm |
| LOWEST RESISTANCE | 2 mOhm |
| TOTAL CAPACITANCE | 12 pF |
| HIGHEST CAPACITANCE TO NET NETNAME | 0.1 pF |
| LOWEST CAPACITANCE TO NET NETNAME | 0.001 pF |
| HIGHEST CAPACITANCE TO FILLMETAL | 0.002 pF |
| LOWEST CAPACITANCE TO FILLMETAL | 0.001 pF |
| INSERT BUFFER | |

BUFFER DISPLAY

| BUFFER NAME | TYPE | RAMP UP/ns | RAMP DOWN/ns |
|---|---|---|---|
| BUFF 10 | NON INV | 0.020 | 0.020 |
| BUFF 11 | NON INV | 0.027 | 0.026 |
| BUFF 17 | NON INV | 0.041 | 0.040 |
| BUFF 34 | INV PAIR | 0.082 | 0.082 |

| CROSSTALK DISPLAY ||||||
| VICTIM NET | DRIVING CELL | CELLTYPE | PARALLEL ROUTING | COUPLING CAPACITANCE | LAYER |
| --- | --- | --- | --- | --- | --- |
| NETA | CELLA | BUF1 | | | |
| AGGRESSOR NETS | DRIVING CELL | CELLTYPE | | | |
| NET1 | CELL1 | BUF10 | 2 mm | 253 pF | METAL5 |
| NET2 | CELL2 | BUF10 | 1.3 mm | 140 pF | METAL5 |
| NET3 | CELL3 | BUF10 | 1.2 mm | 130 pF | METAL5 |
| NET4 | CELL4 | BUF10 | 0.9 mm | 115 pF | METAL5 |
| NET5 | CELL5 | BUF10 | 0.9 mm | 115 pF | METAL5 |

| DRIVE CELL DISPLAY |||
| CELL NAME | RAMP TIME/ns | DELAY/ns |
| --- | --- | --- |
| DRV07 | 0.070 | 0.011 |
| DRV08 | 0.085 | 0.017 |
| DRV17 | 0.016 | 0.008 |
| DRV33 | 0.024 | 0.011 |
| DRV35 | 0.029 | 0.016 |

FIG. 14

TIMING VIOLATION DEBUGGING INSIDE PLACE AND ROUTE TOOL

FIELD OF THE INVENTION

The present invention relates to circuit design tools generally and, more particularly, to a timing violation debugging capability inside a place-and-route tool.

BACKGROUND OF THE INVENTION

Very often in late design stages of an integrated circuit, small timing and crosstalk violations are fixed manually as no tools currently exist to implement the fixes. The violations are commonly caused by constraint changes and functional changes before and during place-and-route operations. To keep the performance results of the integrated circuit consistent through the place-and-route operations, and the rest of the design development, manual interactions are often limited to only the violated parts. To find the best place to implement changes during the place-and-route operation, having all related information available in a bundled form is desirable. The related information includes areas of highest and lowest resistance of a net, highest and lowest capacitance to adjacent nets and the availability of faster, slower and different driver strength cell types for the current cells within the design. In addition, an automatic ability to write out engineering change order (ECO) files, when needed, or implement fixes on the circuit networks, where possible, during the place-and-route operations is also desirable.

Current approaches to implementing the fixes involve manual interactions of the engineers. The engineers have to find a correct solution by reading documentation and datasheets about the cells. A considerable amount of experience with the place-and-route operations is often helpful. However, the manual interactions consume significant time reading the large reports and are prone to human errors. Furthermore, a large number of different software tool licenses must be obtained to acquire the various tools used to analyze different aspects of the circuit design.

SUMMARY OF THE INVENTION

The present invention concerns a method for developing a circuit design. The method generally comprises the steps of (A) generating a violation display based on violation information provided from a place-and-route tool and (B) generating a layout display based on layout information provided from the place-and-route tool. The violation display may include (i) a plurality of performance violations for the circuit design and (ii) a plurality of user inputs each associated with one of the performance violations. The layout display may include a layout view of the circuit design. The layout view may highlight at least one of (i) a plurality of cells and (ii) a plurality of networks each along a path related to a particular one of the performance violations identified by a user through the user inputs.

The objects, features and advantages of the present invention include providing a timing violation debugging capability inside a place-and-route tool that may (i) display timing violations and crosstalk violations from inside the place-and-route tool, (ii) display sources of the timing violations and the crosstalk from inside the place-and-route tool, (iii) display the timing violations and the crosstalk violations in a compressed format, (iv) help reduce a turn-around time for debugging small timing violations and small crosstalk violations inside application specific integrated circuit designs, (v) help reduce an amount of time spend fixing the violations and/or (vi) automatically generate engineering change orders to fix and/or reduce selected violations.

BRIEF DESCRIPTION OF THE DRAWINGS

These and other objects, features and advantages of the present invention will be apparent from the following detailed description and the appended claims and drawings in which:

FIG. 7 is a diagram of an example timing display;

FIG. 8 is a diagram of an example replacement display;

FIG. 10 is a diagram of an example network display;

FIG. 11 is a diagram of an example buffer display;

FIG. 13 is a diagram of an example crosstalk display; and

FIG. 14 is a diagram of an example drive cell display.

DETAILED DESCRIPTION OF THE PREFERRED EMBODIMENTS

Figure 1:
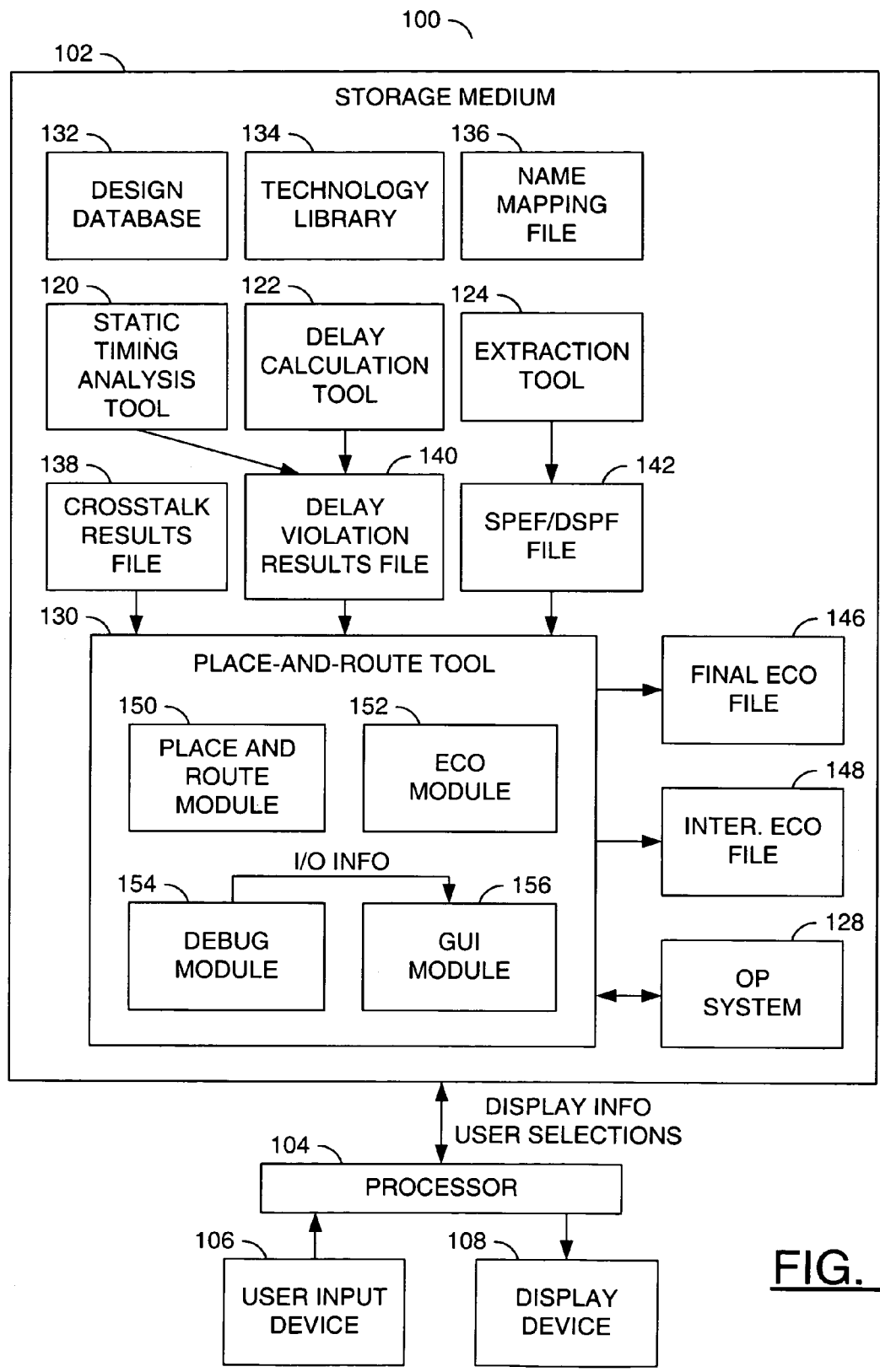
FIG. 1 is a block diagram of an example implementation of a system is shown in accordance with a preferred embodiment of the present invention.

Referring to FIG. 1, a block diagram of an example implementation of a system 100 is shown in accordance with a preferred embodiment of the present invention. The system (or apparatus) generally comprises a circuit (or module) 102, a circuit (or module) 104, a circuit (or module) 106 and a circuit (or module) 108. The circuit 102 may be referred to as storage medium. The storage medium 102 may be implemented as a memory such as a hard drive, Flash memory, optical drive or the like. The storage medium 102 may be readable and writeable to and from the circuit 104.

The circuit 104 may be referred to as a processor circuit. The processor circuit 104 may be operational to read data and software programs (or tools or modules) from the storage medium 102, execute the software and write data back to the storage medium 102. The processor circuit 104 may receive user input data from the circuit 106 and may present user output data to the circuit 108.

The circuit 106 may be referred to as a user input device. The user input device 106 may include one or more mechanisms for the user to enter selections and other information into the system 100. The user input device 106 may include, but is not limited to, a keyboard and a mouse.

The circuit 108 may be referred to as a display device. The display device 108 may include one or more mechanisms for presenting information from the system 100 to the user. The display device 108 may include, but is not limited to, a visual display, a printer and one or more audio speakers.

A general purpose of the system 100 is to bundle all relevant information for a circuit design layout debug inside a place-and-route tool executed by the processor circuit 104. The relevant information may be related to any kind of network (or "net" for short) or cell. The information may be shown to the user in a compressed form on a display. Showing the information to the user from the place-and-route tool generally eases the work of debugging the circuit design during place-and-route related cleanup operations. The debugging may be useful in late design stages to fix one or more remaining timing violation and/or one or more crosstalk violations quickly and easily.

The storage medium 102 may store multiple software tools (or programs) and multiple electronic files. The software tools generally comprise a static timing analysis (STA) tool (or program) 120, a delay calculation tool (or program) 122, an extraction tool (or program) 124, an operating system (or program) 128 and a place-and-route tool (or program) 130. The electronic files generally comprise a design database (or file) 132, a technology library (or file) 134, a name mapping file 136, a crosstalk result file 138, a delay violation result file 140, an extraction file 142, a final engineering change order (ECO) file 146 and an intermediate ECO file 148. Other software tools and files may be stored in the storage medium 102 to meet the criteria of a particular application.

The STA tool 120 and the delay calculation tool 122 are known in the art. The extraction tool 124 may be operational to extract information from the circuit design and present the information in a standard parasitic exchange (SPEF) format and/or a detailed standard parasitic format (DSPF). The extraction tool 124 is known in the art.

The place-and-route tool 130 generally comprises a place-and-route core module (or program) 150, an ECO module (or program) 152, a debug module (or program) 154 and a graphical user interface (GUI) module (or program) 156. The place-and-route tool 130 may be operational to read and/or write to the various files 132-148. Communication may also be provided between the place-and-route tool 130 and the operating system 128 to transfer information to and from the user via the user input device 106 and the display device 108.

The place-and-route core module 150 may be operational to perform conventional place-and-route operations. For example, the place-and-route core module 150 may automatically place multiple cells of the circuit design within a die layout constraint and route multiple nets between the pins (or interfaces) of the cells.

The ECO module 152 may be operational to automatically generate one or more intermediate ECOs based on changes indicated by the user through the various graphical user interfaces (displays or windows) initiated by the debug module 154. The intermediate ECOs may be written to the intermediate ECO file 148 and/or temporarily stored in a memory of the processor 104. Upon receipt of a user command, the ECO module 152 may be operational to read the intermediate ECOs from the intermediate ECO file 148 and generate a final ECO containing all of the selected changes. The final ECO may be written to the final ECO file 146.

The debug module 154 may be operational to walk the user through a sequence of displays useful in debugging performance violations found in the circuit design. The debug module 154 may generate output information in an information signal (e.g., I/O INFO) containing the types of data to be presented to the user and containing the types of user inputs to be presented to the user. The output information may be transferred to the GUI module 156 for formatting. Input information in the signal I/O INFO carrying the user selections may be received back to the debug module 154.

The GUI module 156 may be operational to arrange the output information in a plurality of formats suitable for a plurality of display screens (or "display" for short) to the user. The various formats may result in a series of calls and transfers to the operating system 128 to cause graphical user interfaces (e.g., displays or windows) to be presented by the display device 108. The GUI module 156 may also receive a plurality of selections from the user through the user input device 106 via the operating system 128. The user selections may be passed back to the debug module 154 as the input information.

Figure 2:
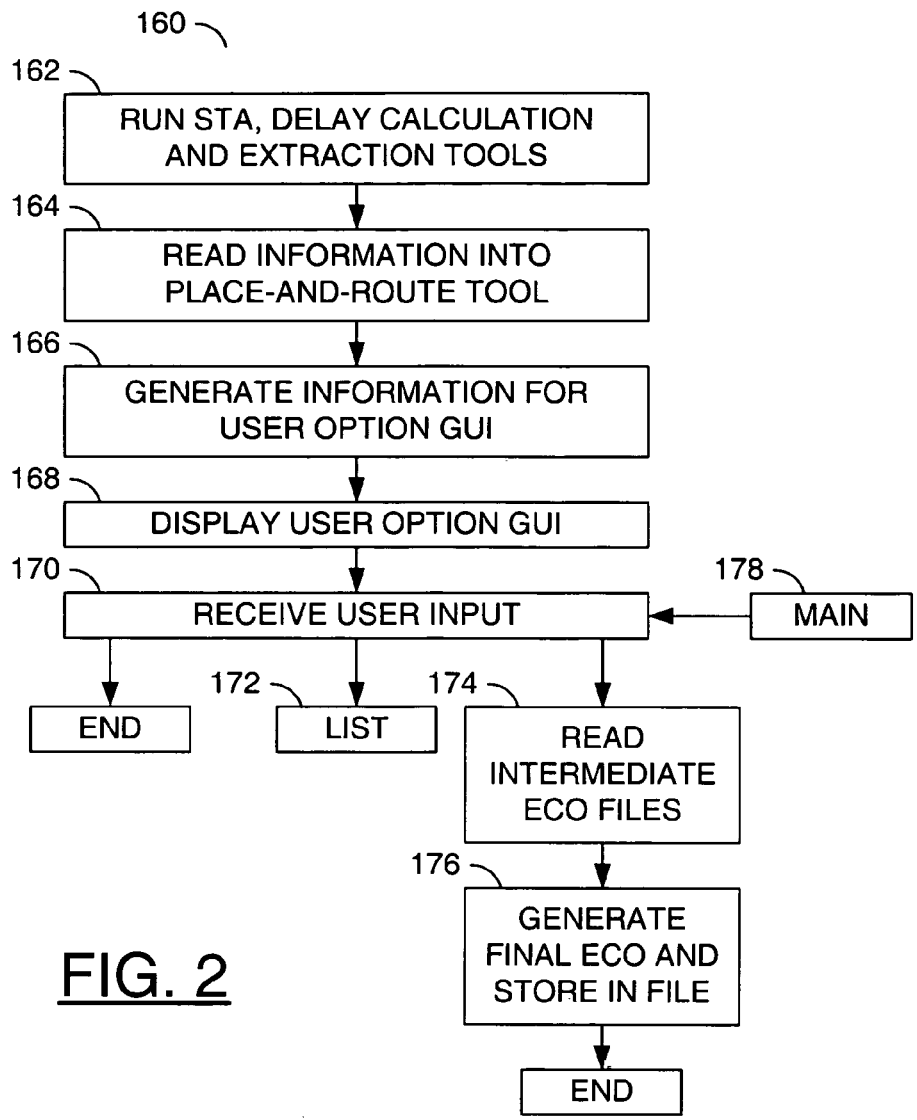
FIG. 2 is a flow diagram of an example method for developing a circuit design.

Referring to FIG. 2, a flow diagram of an example method 160 for developing a circuit design is shown. The method (or process) 160 generally comprises a step (or block) 162, a step (or block) 164, a step (or block) 166, a step (or block) 168, a step (or block) 170, a step (or block) 172, a step (or block) 174, a step (or block) 176 and a step (or block) 178. The method 160 may begin with the execution of the STA tool 120, the delay calculation tool 122 and the extraction tool 124 in the step 162. Results from the STA tool 120 and the delay calculation tool 122 may be stored in the delay violation results file 140. Results from the extraction tool 124 may be stored in the SPEF/DSPF extraction file 142.

In the step 164, the performance violations in the crosstalk results file 138, the delay violation results file 140, the SPEF/DSPF file 142 may be read into the place-and-route tool 130. Data from the name mapping file 136 and the design database 132 may also be read into the place-and-route tool 130. Resistance values and capacitance values may be available from the SPEF/DSPF file 142. Additionally the place-and-route tool 130 may read the timing violations such as setup timing violations, hold time violations and ramp time violations, generally available from the delay violation results file 140. Network crosstalk violations may be available from the crosstalk results file 138. Other violations and performance information may be generated internally by the place-and-route module 150 and made available to the debug module 154.

The debug module 154 may determine if any timing violation data exists to show to the user. If yes, the debug module 154 may command the GUI module 156 to generate and present user option information to cause a main display to be created by the display device 108 in the step 168. If not, the debug module 154 may command the GUI module 156 to generate and present information to cause a message to be presented to the user stating that no violations were found.

Figure 3:
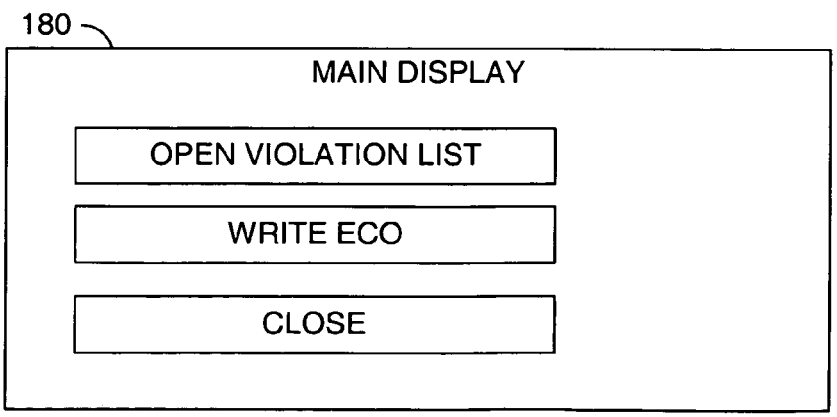
FIG. 3 is a diagram of an example main display.

FIG. 3 is a diagram of an example main display 180 is shown. The main display 180 may implement a graphical user interface that allows the user to select from among several different actions for the place-and-route tool 130 to perform. The main display 180 generally comprises an open violation list button (or input) 182, a write ECO button (or input) 184 and a close button (or input) 186. Selection of the close button 180 by the user (e.g., the CLOSE path from the step 170) may cause the debug module 154 to save all relevant data and end the current debugging operations.

Selection of the open violation list button 182 by the user (e.g., the LIST path from step 170) may cause the debug module 154 to assemble a list of all performance violations available to the place-and-route tool 130. The method 160 may proceed to the list operations (FIG. 4) through the block 172.

Selection of the write ECO button 186 by the user (e.g., the WRITE path from the step 170) may cause the debug module 154 to command the ECO module 152 to generate a final ECO for the current debugging session. The ECO module 152 may respond to the ECO command by reading any intermediate ECOs stored in the intermediate ECO file 148 and/or temporarily in a memory of the processor 104 in the step 174. The ECO module 152 may combine the intermediate ECOs to generate the final ECO and store the final ECO in the final ECO file 146 in the step 176. The final ECO may then be displayed and/or printed through the display device 108.

Figure 4:
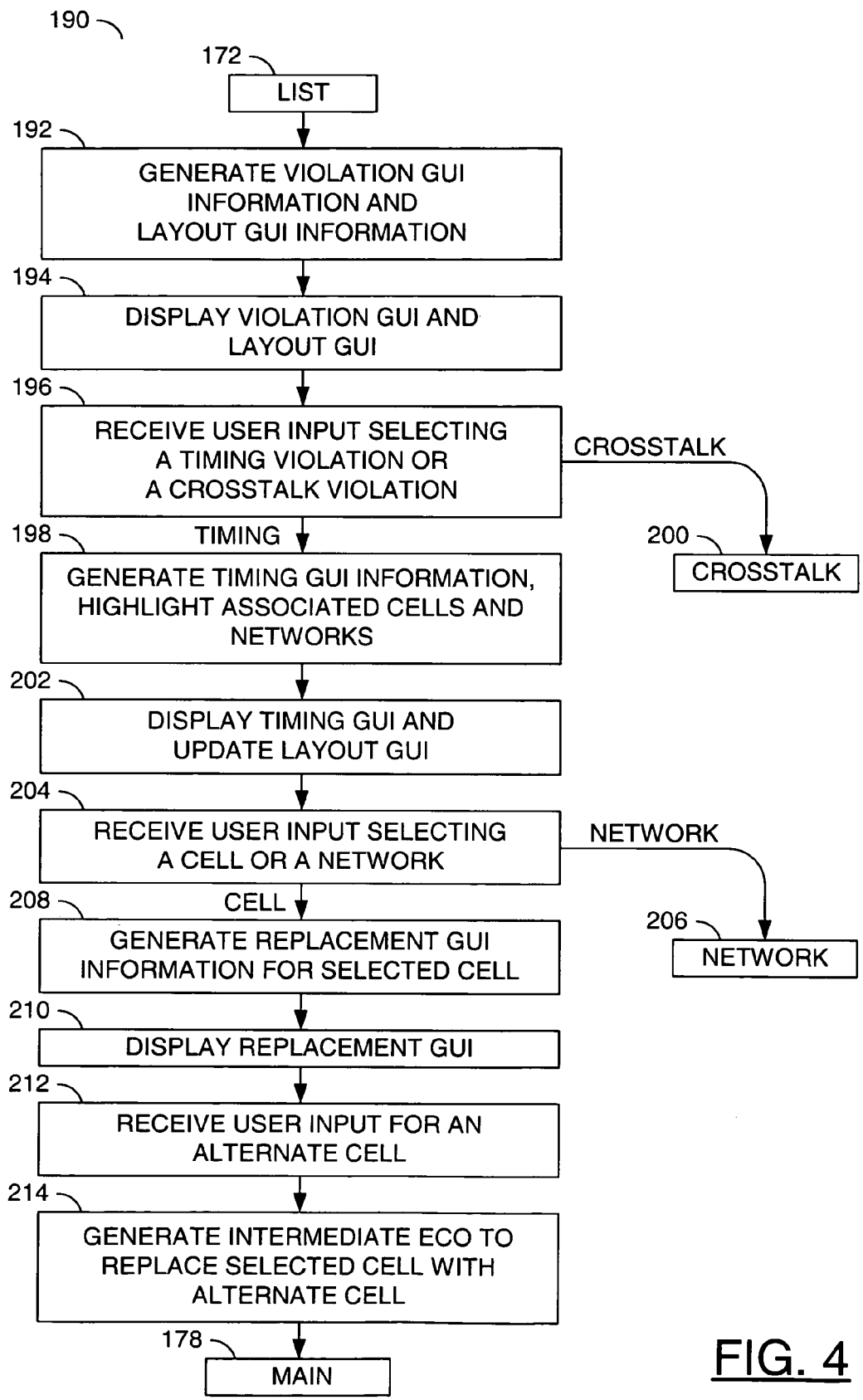
FIG. 4 is a flow diagram of an example method for handling timing violations.

Referring to FIG. 4, a flow diagram of an example method 190 for handling timing violations is shown. The method (or process) 190 generally comprises the block 172, a step (or block) 192, a step (or block) 194, a step (or block) 196, a step (or block) 198, a step (or block) 200, a step (or block) 202, a step (or block) 204, a step (or block) 206, a step (or block) 208, a step (or block) 210, a step (or block) 212, a step (or block) 214 and the block 178.

In the step 192, the debug module 154 may generate violation information suitable for generating a GUI displaying all of the performance violations available to the place-and-route tool 130. The debug module 154 may also generate layout information suitable for generating a GUI displaying some or a portion of a layout view of the circuit design in the step 192. The layout view may be implemented as a frame view. A frame view is generally an abstract layout view of one or more cells and one or more nets of circuit showing pins, contacts and blockage areas in various fabrication layers. The violation GUI and the aggressor GUI may be displayed to the user in the step 194.

Figures 5, 6:
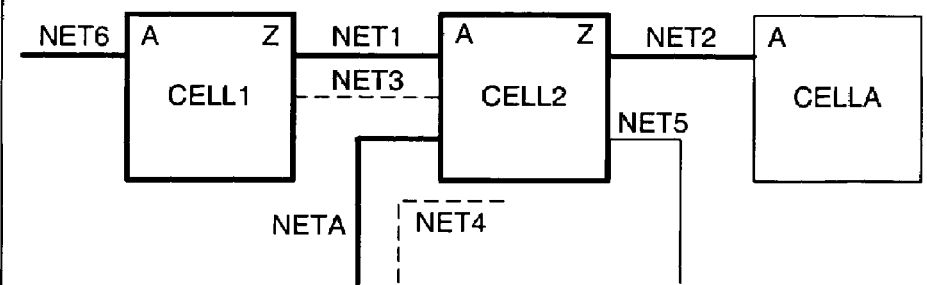
FIG. 5 is a diagram of an example violation display.
FIG. 6 is a diagram of an example layout display.

Referring to FIG. 5, a diagram of an example violation display (GUI) 220 is shown. The violation display 220 may be implemented as a two-dimensional table. Different types of timing violations and signal integrity violations, along with associated performance values may be disposed along a first axis (e.g., an x-axis) of the table. The violation display 220 generally shows various kinds of violations ordered from the largest violations to the smallest violations. Cell names/pin names associated with the violations may be displayed. The timing values may be the results from the delay calculation tool 122 and the STA tool 120. The crosstalk nets may be victim nets or the aggressor nets listed in the crosstalk calculation report file 138.

Each of the violations and values may be disposed in a separate column. A second axis (e.g., a y-axis) of the table may contain a legend row and at least one additional row for the violations. The total number of rows may vary with a maximum number of violations in a most-used column. Examples of the timing violations include a setup time, a hold time, a ramp time (covering both ramp up and ramp down), overdrive, and out of characterization range violations. A setup time generally refers to an amount of time a signal is specified to remain valid before a clock edge use to sample the signal. A hold time generally refers to an amount of time a signal is specified to remain valid after a clock edge used to sample the signal. A ramp time generally refers to an amount of time a signal is specified to ramp up from a starting level to an ending level and/or an amount of time a signal is specified to ramp down from a starting level to an ending level. An example of a signal integrity violation is a crosstalk violation. Crosstalk generally referred to an amount of noise induced on a victim net by one or more neighboring aggressor nets and/or crossing nets. The noise may be transferred between nets due to capacitance coupling and/or inductive coupling. In other embodiments, the place-and-route tool 130 may be configured to display other signal integrity violations, such as ground bounce, noise, electromigration and the like.

Referring to FIG. 6, a diagram of an example layout display (GUI) 222 is shown. The layout display 222 generally comprises one or more cells (e.g., CELL1, CELL2 and CELLA) and one or more nets (e.g., NET1-NET6 and NETA) connecting the cells. The layout display 222 may show each individual cell and network as either normal or highlighted. In the example illustrated, CELL1 and CELL2 are highlighted (e.g., bold, color or flashing) while CELLA is shown as normal. Likewise, NET1-NET4 and NETA are shown highlighted while NET5 and NET6 are shown as normal.

Returning to FIG. 4, in the step 196, the place-and-route tool 130 may receive a user input selecting a particular timing violation or a particular crosstalk violation presented in the violation display 220. The place-and-route tool 130 generally differentiates between the timing violations and the crosstalk violations. If any crosstalk violation is selected (e.g., user places a mouse cursor over the appropriate cell in the table and left clicks), the method 190 may proceed to the crosstalk operations (FIG. 12) through the block 200.

If any timing violation is selected, the debug module 154 may generate timing information in the step 198 suitable to cause a timing GUI to be displayed to the user via the display device 108. The debug module 154 may also be operational in the step 198 to highlight the associated cells and/or nets shown in the layout GUI 222. The timing GUI may be displayed and the layout GUI 222 may be altered to incorporate the highlighting in the step 202. In selecting a particular cell or a particular net to fix (e.g., CELLA/PINA), the debug module 154 may highlight a complete path related to the violated pin (e.g., CELLA/PINA) and highlight in another way (e.g., flashing) the areas in the path that may be the real violators.

Referring to FIG. 7, a diagram of an example timing display (GUI) 230 for a setup timing violation is shown. The timing display 230 may be implemented as a two-dimensional table. The table is generally a shortened (e.g., compressed) form of the reports from the STA tool 120 and the delay calculator tool 122. A path name legend, a net name legend, a delay legend and a ramp time legend may be disposed along a first axis (e.g., an x-axis) of the table. The cell names/pin names and net names in the path may be disposed along a second axis (e.g., a y-axis). The timing delay values and ramp time values may be displayed in respective columns. Timing displays for hold time violations and for ramp time violations may be similar to the timing display 230 for the setup timing violation.

Looking at the values in the timing display 230 suggests some areas of improvement may be possible. In a first example, the delay of CELL2 may be high compared with CELL1, assuming that the same cell type is used in both CELL1 and CELL2. In a second example, the delay of NET2 may be high relative to the delay of NET1. Selecting one of the net table cells (e.g., NET2) in the timing display 230 may cause the place-and-route tool 130 to proceed with a set of network operations (FIG. 9) through the block 206. By clicking on one of the path table cells (e.g., CELL2/PINA-CELL2/PINZ) inside the report in the step 204, a new replacement GUI window may be generated in steps 208 and 210 that shows a list of the alternative cells, available in the technology library 134 with related values (e.g., size, input capacitance, etc.).

Referring to FIG. 8, a diagram of an example replacement display (GUI) 232 for alternate cells is shown. The replacement display 232 may be implemented as a two-dimensional table. A cell name legend, a delay legend and a ramp time, setup time and/or hold time legend may be disposed along a first axis (e.g., an x-axis) of the table. The available alternate cell names may be disposed along a second axis (e.g., a y-axis). The performance values of the cells may be displayed in respective columns.

The place-and-route tool 130 may receive a selection of a particular alternate cell from the user in the step 212 that may fix or reduce the violation. The ECO module 152 may respond to the selection by automatically generating and storing an intermediate ECO in the step 214. The intermediate ECO may be stored in the intermediate ECO file 148 and/or temporarily in a memory of the processor 104. The method 190 may then return to the main display via the block 178.

Figure 9:
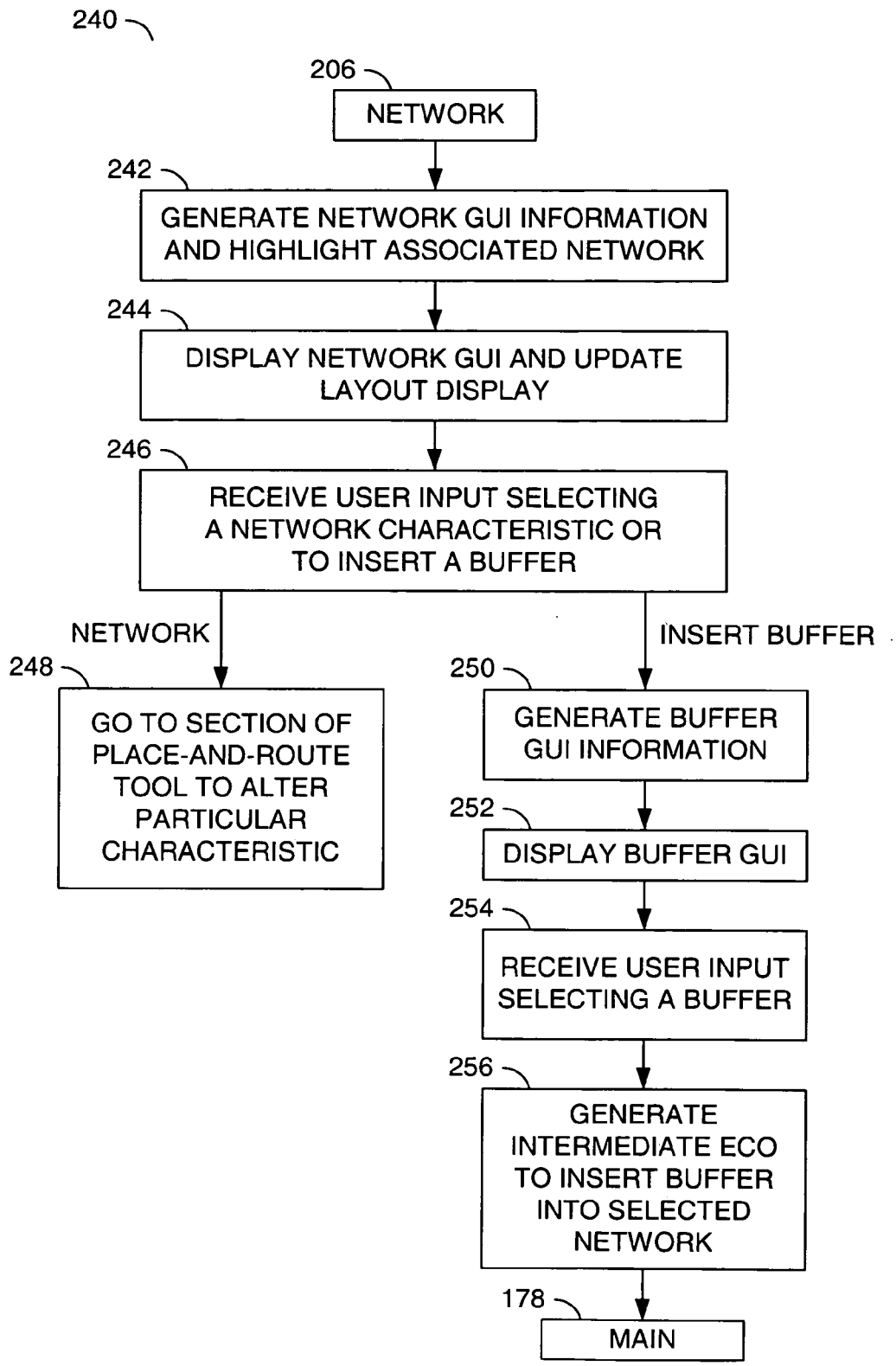
FIG. 9 is a flow diagram of an example method for handling network violations.

Referring to FIG. 9, a flow diagram of an example method 240 for handling network violations is shown. The method (or process) 240 generally comprises the block 206, a step (or block) 242, a step (or block) 244, a step (or block) 246, a step (or block) 248, a step (or block) 250, a step (or block) 252, a step (or block) 254, a step (or block) 256 and the block 178.

If the place-and-route tool 130 receives a user input selecting a particular net from the violation display 220 in the step 204 (FIG. 4), the debug tool 154 may change the layout information in the step 242 to highlight the net in the layout display 222. The debug tool 154 may also generate network information in the step 242 to cause a network display (GUI) 260 to be shown to the user via the display device 108 in the step 244. The network display 260 generally shows information about the particular net that may be relevant to fixing the selected network violation.

Referring to FIG. 10, a diagram of an example network display (GUI) 260 is shown. The network display 260 may be implemented as a two-dimensional table. The network information shown in the network table generally comprises a net length, a total resistance, an area of highest and lowest resistance, a total capacitance and an area of highest and lowest capacitance to adjacent nets and to metal (used for fulfilling the technology density criteria). The resistance and capacitance values may be provided from the extraction tool 124. The net length may be generated by the place-and-route core module 150. Selecting one of the network characteristic items in the step 246 inside the table of the network display 260 may cause the method 240 to transfer to as associated area inside the place-and-route core module 150 in the step 248 where the selected network characteristic may be modified.

A last table cell in the network display 260 may have a user input button having a legend (e.g., INSERT BUFFER). User selection of the INSERT BUFFER button may instruct the debug module 154 to generate buffer information in the step 250. The buffer information generally results in the presentation a buffer display 262 to the user in the step 252.

Referring to FIG. 11, a diagram of an example buffer display (GU) 262 is shown. The buffer display may be implemented as a two-dimensional table. The buffer table may show a listing of buffers (e.g., inverting pairs and non-inverting devices) and respective parameters available from the technology library 134. The available buffers may be used to correct hold time violations, ramp timing violations and/or other cell timing violations.

Returning to FIG. 9, the place-and-route tool 130 may receive a user selection of a particular buffer/inverter pair in the step 254. The ECO module 152 may then generate and store and intermediate ECO in the intermediate ECO file 148 and/or temporarily in a memory of the processor 104 for the particular buffer in the step 256. Optional manual fixes involving insertions or deletions of fill metal may also be performed by using the functionality of the place-and-route core module 150. The method 240 may then return to the main display 180 via the block 178.

Figure 12:
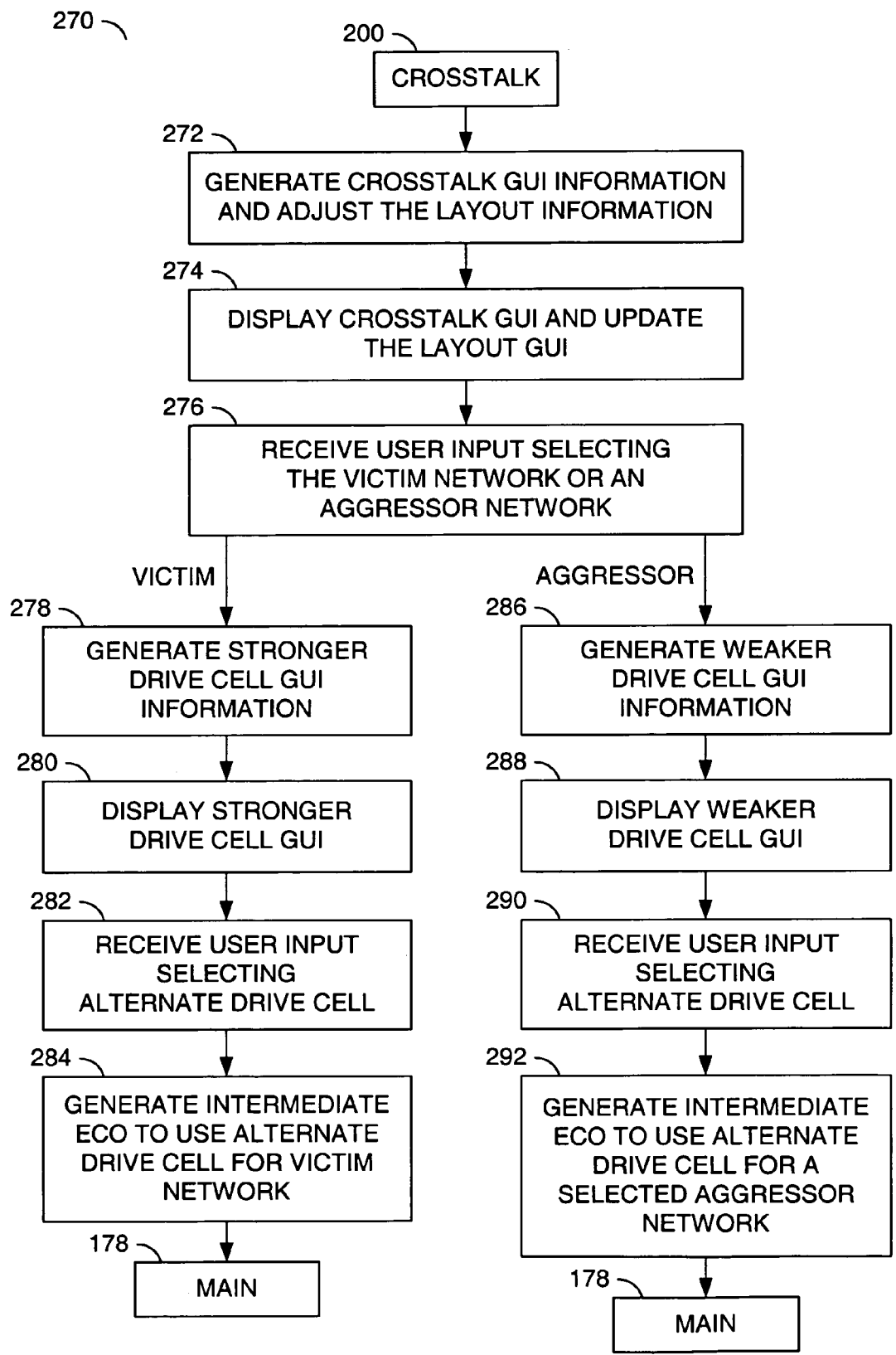
FIG. 12 is a flow diagram of an example method for handling crosstalk violations.

Referring to FIG. 12, a flow diagram of an example method 270 for handling crosstalk violations is shown. The method (or process) 270 generally comprises the block 200, a step (or block) 272, a step (or block) 274, a step (or block) 276, a step (or block) 278, a step (or block) 280, a step (or block) 282, a step (or block) 284, a step (or block) 286, a step (or block) 288, a step (or block) 290, a step (or block) 292 and the block 178.

Fixing crosstalk violations may be initiated by the user selecting a particular net from the network table in the network display 260. The debug module 154 may then generate crosstalk information in the step 272 associated with the selected net. The crosstalk information may be used to generate a new crosstalk display window and update the layout display 222 in the step 274.

Referring to FIG. 13, a diagram of an example crosstalk display (GUI) 300 is shown. The crosstalk display 300 may be implemented as a two-dimensional table. The crosstalk table generally comprises a list of up to a predetermined maximum number (e.g., 5) of the largest aggressor nets that contribute to the crosstalk in the selected victim net (e.g., NETA). The list may include, but is not limited to, a driving cell, a length of parallel routing and which layer is used by each of the aggressor nets. In a parallel (simultaneous) operation in the step 272, the debug module 154 may update the layout information to highlight the victim net (e.g., NETA) in one color (e.g., red or bold) and the aggressor nets (e.g., NET3 and NET4) in another color (e.g., green or dashed) in the layout display 222

Returning to FIG. 12, the user may select a particular DRIVING CELL table cell in the VICTIM NET line in the network table in the step 276. The debug module 154 may respond to the selection by generating stronger drive cell information related to the selected driving cell in the step 278. The stronger drive cell information may be used to generate a drive cell display in the step 280.

Referring to FIG. 14, a diagram of an example drive cell display (GUI) 302 is shown. The drive cell display 302 may be implemented as a two-dimensional table. The drive cell table generally lists various alternate cell types and the relative characteristics available in the technology library 134. For a victim net, the alternate drive cells may be stronger drive cells than the current drive cell used in the circuit design for driving the victim net.

Returning to FIG. 12, the user may select one of the stronger drive cells to replace the current drive cell in the step 282. The ECO module 152 may respond to the stronger drive cell selection by generating an intermediate ECO in the step 284. The intermediate ECO may be stored in the intermediate ECO file 148 and/or temporarily in the memory of the processor 104.

If the user selects a DRIVING CELL input in an AGGRESSOR NET line from the crosstalk display in the step 276, the debug module 154 may generate weaker drive cell information related to the selected drive cell in the step 286. The weaker drive cell information may be used to generate the drive cell display 302 to the user in the step 288. The drive cell display 302 created from the weaker drive cell information may have a similar format as created from the stronger drive cell information (see step 278). However, the weaker drive cell information generally lists the available drive cells from the technology library 134 having weaker drive cell types than the selected aggressor net. Upon receipt of a user selection for an alternate weaker drive cell in the step 290, the ECO module 152 may generate an intermediate ECO in the step 292 to replace the current drive cell of the selected aggressor net. The intermediate ECO may be stored in the intermediate ECO file 148 and/or temporarily in the memory of the processor 104 as part of the step 292. The user may also be given an option to change the routing of the nets by moving away (rerouting) the victim net from the aggressor nets or the other way round. Net rerouting may be an optional task that may be performed by using the functionality of the place-and-route core module 150. Afterwards, the method 270 may return to the main display 180 via the block 178.

The function performed by the flow diagrams of FIGS. 2, 4, 9 and 12 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A method of developing a circuit design, comprising the steps of:
  (A) generating a violation display based on violation information provided from a place-and-route tool, said violation display being viewable by a user and depicts (i) a plurality of performance violations in said circuit design and (ii) a plurality of user selectable buttons each associated with one of said performance violations;
  (B) generating a layout display based on layout information provided from said place-and-route tool, said layout display being viewable by said user and depicts a layout view of said circuit design, said layout view highlighting at least one element of (i) a plurality of cells and (ii) a plurality of networks, wherein each of said at least one element is along a path related to a particular one of said performance violations identified by said user through said user selectable buttons; and
  (C) generating a crosstalk display based on crosstalk information from said place-and-route tool in response to said user identifying a particular crosstalk violation of said performance violations, said crosstalk display being viewable by said user and depicting (i) a victim network in said circuit design associated with said particular crosstalk violation and (ii) up to a predetermined number of aggressor networks in said circuit design contributing to said particular crosstalk violation.

2. The method according to claim 1, further comprising the step of:
  reading said performance violations into said place-and-route tool from at least one file.

3. The method according to claim 1, further comprising the step of:
  generating a timing display based on timing information from said place-and-route tool in response to said user identifying a particular timing violation of said performance violations, said timing display including at least one element of (i) at least one cell and (ii) at least one network, wherein each of said at least one element is related to said particular timing violation.

4. The method according to claim 3, further comprising the step of:
  generating a replacement display based on replacement information from said place-and-route tool in response to said user identifying a particular cell of said at least one cell, said replacement display being viewable by said user and depicting at least one alternate cell selectable by said user as a replacement of said particular cell to correct said particular timing violation.

5. The method according to claim 4, further comprising the step of:
  automatically generating an engineering change order based on said user identifying one of said at least one alternate cell to replace said particular cell.

6. The method according to claim 3, further comprising the step of:
  generating a network display based on network information from said place-and-route tool in response to said user identifying a particular network of said at least one network, said network display being viewable by said user and depicting (i) a plurality of characteristics of said particular network and (ii) an insert buffer button of said user selectable buttons.

7. The method according to claim 6, further comprising the step of:
  generating a buffer display based on buffer information from said place-and-route tool in response to said user asserting said insert buffer button, said buffer display being viewable by said user and depicting at least one buffer available to insert into said particular network to correct said particular timing violation.

8. The method according to claim 7, further comprising the step of:
  automatically generating an engineering change order based on said user identifying one of said at least one buffer to insert into said particular network.

9. The method according to claim 1, further comprising the step of:
  generating a drive cell display based on drive cell information from said place-and-route tool in response to said user identifying said victim network through said user selectable buttons, said drive cell display being viewable by said user and depicting at least one alternate drive cell available to insert into said victim network to correct said particular crosstalk violation.

10. The method according to claim 9, further comprising the step of:
   automatically generating an engineering change order based on said user identifying one of said at least one alternate drive cell to insert into said victim network.

11. The method according to claim 1, further comprising the step of:
   generating a drive cell display based on drive cell information from said place-and-route tool in response to said user identifying a particular aggressor network of said aggressor networks, said drive cell display being viewable by said user and depicting at least one alternate drive cell available to insert into said particular aggressor network to correct said particular crosstalk violation.

12. The method according to claim 11, further comprising the step of:
   automatically generating an engineering change order based on said user identifying one of said at least one alternate drive cell to insert into said particular aggressor network.

13. A storage medium for use in a computer to develop a circuit design, the storage medium recording a place-and-route tool that is readable and executable by the computer, the place-and-route tool comprising the steps of:
   (A) reading a plurality of performance violations in said circuit design from at least one file;
   (B) generating violation information suitable to show in a first display viewable by a user, said violation information including (i) a plurality of performance violations in said circuit design and (ii) a plurality of user selectable buttons each associated with one of said performance violations;
   (C) generating layout information suitable to show in a second display viewable by said user, said layout information including a layout view of said circuit design, said layout view highlighting at least one element of (i) a plurality of cells and (ii) a plurality of networks, wherein each of said at least one element is along a path related to a particular one of said performance violations identified through said user selectable buttons; and
   (D) generating a crosstalk display based on crosstalk information from said place-and-route tool in response to said user identifying a particular crosstalk violation of said performance violations, said crosstalk display being viewable by said user and depicting (i) a victim network in said circuit design associated with said particular crosstalk violation and (ii) up to a predetermined number of aggressor networks in said circuit design contributing to said particular crosstalk violation.

14. The storage medium according to claim 13, wherein said place-and-route tool further comprises the step of:
   generating change information suitable to show in a plurality of third displays viewable by said user, each of said third displays including (i) a sub-set of said performance violations and (ii) at least one option to modify said circuit design.

15. The storage medium according to claim 14, wherein said place-and-route tool further comprises the step of:
   generating an engineering change order based on said at least one option to modify said circuit design as selected by said user through said user selectable buttons.

16. The storage medium according to claim 14, wherein said third displays comprise (i) a first graphical user interface displaying a plurality of timing violations in said circuit design, (ii) a second graphical user interface displaying a plurality of replacement cells to fix said timing violations, (iii) a third graphical user interface displaying a plurality of network characteristics related to said timing violations, (iv) a fourth graphical user interface displaying a plurality of buffers suitable to insert into said networks, (v) a fifth crosstalk graphical user interface displaying a victim network having a crosstalk violation of said performance violations and up to a predetermined number of aggressor networks corrupting said victim network and (vi) a sixth graphical user interface displaying a plurality of alternate drive cells suitable to insert at least one network among said victim network and said aggressor networks.

17. The storage medium according to claim 13, wherein said first display is configured to show (i) a plurality of setup timing violations of said performance violations, (ii) a plurality of hold time violations of said performance violations, (iii) a plurality of ramp time violations of said performance violations and (iv) a plurality of crosstalk violations of said performance violations.

18. A computer program comprising:
   a place-and-route module configured to perform a plurality of cell placement operations and a plurality of network routing operations for a circuit design;
   a debug module configured to generate information for (i) timing violation data for said circuit design, (ii) crosstalk violation data for said circuit design and (iii) a plurality of user inputs associated with a respective one of said timing violation data and said crosstalk violation data;
   a graphical user interface module configured to (i) arrange said information in a plurality of formats suitable for a plurality of displays to a user and (ii) receive a plurality of selections from said user through said user inputs to correct said circuit design; and
   generating a crosstalk display based on crosstalk information from said place-and-route tool in response to said user identifying a particular crosstalk violation of said performance violations, said crosstalk display being viewable by said user and depicting (i) a victim network in said circuit design associated with said particular crosstalk violation and (ii) up to a predetermined number of aggressor networks in said circuit design contributing to said particular crosstalk violation.

19. The computer program according to claim 18, further comprising:
   an engineering change order module configured to (i) generate a plurality of intermediate engineering change order files and (ii) combine said intermediate engineering change order files into a final engineering change order file to modify said circuit design.

* * * * *